April 29, 1958     C. E. M. MOSE     2,832,343
DILATORS
Filed April 12, 1955
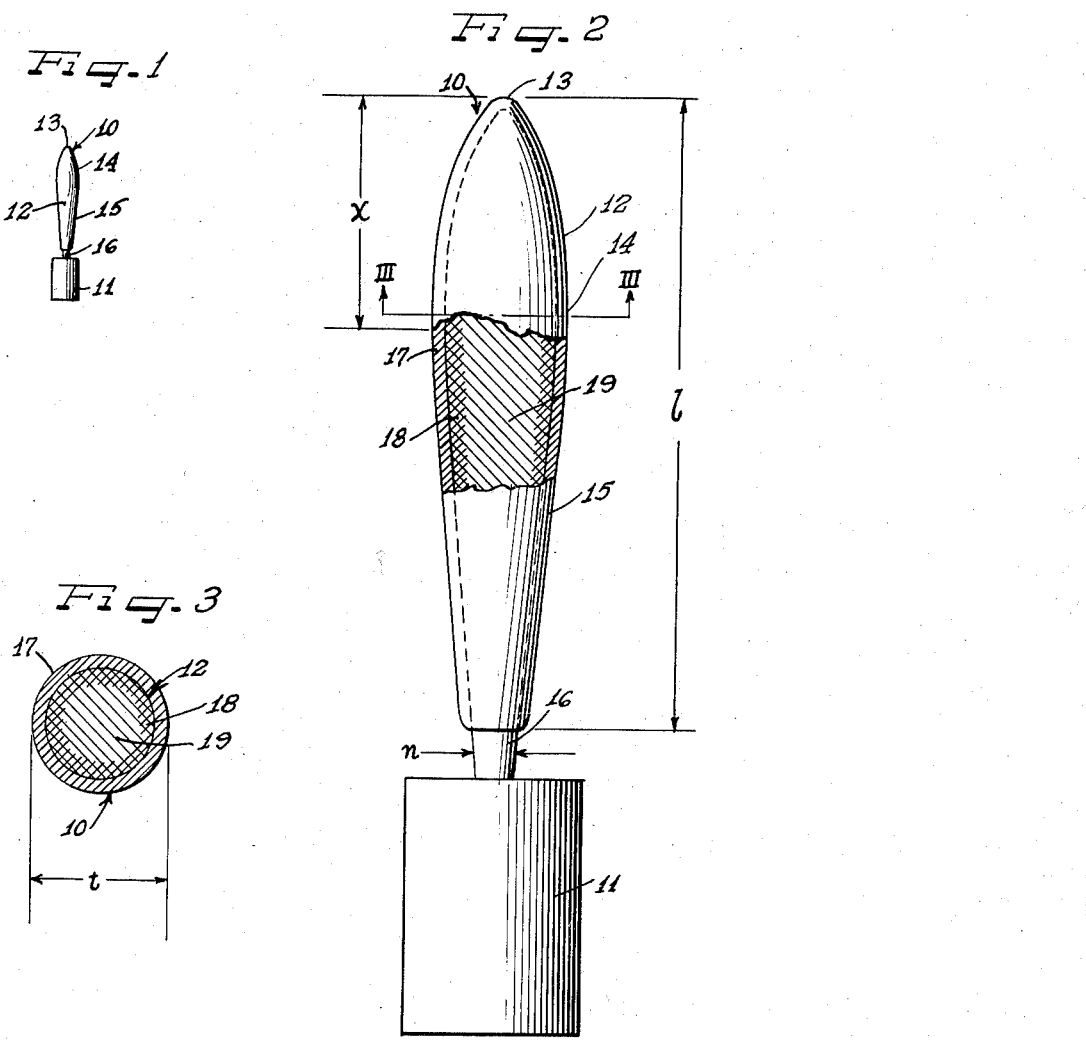
Inventor
Clara Emilie Marie Mose

United States Patent Office 2,832,343
Patented Apr. 29, 1958

2,832,343

DILATORS

Clara Emilie Marie Mose, Randers, Denmark

Application April 12, 1955, Serial No. 500,946

5 Claims. (Cl. 128—271)

The instant invention relates to a pharmaceutical device and composition for use with mammals, and particularly, for use in the dilation of the milk duct in the mammalian teat.

Although the instant invention is applicable to the treatment of any mammals or milk bearing animals, it will be described in particular detail in connection with the treatment of milch cows. As will be appreciated, the frequent milking of the cow according to the normal schedule requires manipulation of the teats, and the teats and udder of the cow are also substantially exposed during the normal movement of the cow in the pasture, so that injuries to the teats may occur quite easily and such injuries may very easily be aggravated because of the lack of protection and/or repeated handling of the teats during milking. For years people have been concerned with the general problem, although the solutions to this problem heretofore offered always left much to be desired; and there is a very great need in the industry for a practical answer to the problem.

It appears that the general thought in the art was that the initial cause of such injuries was primarily from some external source causing external irritation of the teats and udder, this being followed by inflammation or swelling which tended to block off the milk duct. A number of remedies have been proposed for washing and rinsing the teats with various antiseptic and soothing solutions and ointments in order to relieve this condition. It was also understood that, once the milk duct had been adequately blocked through inflammation or swelling there was an increased tendency for additional irritation from within the udder and/or teat, which could ultimately lead to actual infection within the udder and/or teat. A number of "sounds" or "bougies" have been suggested for forcing the milk duct open. Also, sharp instruments such as knives have been used for this purpose. The suggested procedure in such cases is that of opening the milk duct and perhaps rinsing out the entire udder with various antiseptic solutions. The application of camphorated ointment using dilators has also been suggested in an effort to soothe irritated regions within the milk duct as well as on the outside of the teat. To be sure, each of the various remedies suggested has met with at least limited success; but it is a general rule that these remedies appear to be more or less temporary in character, merely alleviating an acute condition without serving appreciably to prevent subsequent recurrence thereof. In other words, if a cow was classified as a "hard milker," that was all there was to it and the cow would be expected to remain a hard milker unless her milk duct was dilated by some means. Also, cows which had undergone serious teat damage or had not been cared for quickly enough might well become "hard milkers" thereafter. The main idea appeared to be to soothe any irritation which might occur in such cows as quickly as possible; but it appears that no one had offered any practical suggestion for reducing the sensitivity of cows toward afflictions of this type, and particularly the sensitivity of "hard milkers" toward disorders of this type.

The instant invention, in contrast, is based upon an entirely different approach to the whole problem. The instant invention is based upon a discovery of a way to reduce the general sensitivity of cows toward afflictions of this type, or at least to reduce the sensitivity of "hard milkers" and similarly defective cows which have suffered previous mastitic injuries or attacks. A key to the instant invention lies in an analysis of the defective nature (naturally occurring or injury induced) of cows which were apparently defective in this respect; and then devising a corrective or preventive treatment against future occurrences of such afflictions, rather than devising simply a treatment for such afflictions, once they occur. The instant invention is particularly satisfactory, however, for the treatment of such afflictions during the acute stages thereof, but the instant treatment in accordance with the teachings of the present invention goes much farther than to merely alleviate temporarily the acute symptoms.

The instant invention thus has as an important object thereof the provision for a pharmaceutical means and composition for the treatment of damaged milk ducts and mammalian teats, as well as the reduction of a sensitivity in the mammalian teats toward recurrence of damage, inflammation, etc.

A further important object of the present invention is to provide an improved dilator structure, with an improved pharmaceutical composition or coating mounted on such dilator structure, for the purpose of therapeutically treating the milk duct in the mammalian teat.

Yet another object of the instant invention is to provide, as an improved dilator for the milk duct in the mammalian teat, a manually graspable base member, an elongated rigid dilator member secured to said base and having a rounded bluntly pointed free end portion which expands slightly in cylindrical cross-section near the free end and then gradually tapers through a decreasing cross-section down to the end secured to the base, the expanded portion of the dilator being slightly greater than the ordinary duct cross-section to expand the latter upon insertion therein, a coating layer on said dilator member of salicylic acid, and glycerol impregnating said layer rendering the same coherent and adhesive to the dilator and providing lubrication for insertion of the dilator into the duct.

Other and further objects, features and advantages of the present invention will become apparent to those skilled in the art from the following detailed disclosure thereof including the attached drawings which form a part hereof, showing a preferred embodiment of the instant invention.

On the drawings:

Figure 1 is a full scale view of a dilator embodying the instant invention;

Figure 2 is an enlarged elevational view of the dilator of Figure 1, with parts shown in section and parts broken away; and Figure 3 is an enlarged detail sectional view taken substantially along line III—III of Figure 2.

As shown on the drawings:

In the drawings, the dilator indicated generally by the reference numeral 10 for the milk duct in the mammalian teat has a small generally cylindrical manually graspable wooden dilator member 12 extending from the base 11 and having a rounded bluntly pointed free end portion 13 which expands slightly in cylindrical cross-section (to about 14) near the free end 13 and then gradually tapers through a decreasing cross-sectional portion 15 down to the end 16 secured to the base 11, the expanded portion 14 of the dilator 10 being slightly greater than the ordinary milk duct cross-section to expand the latter upon insertion therein, whereas the thin tapered end 16 of the dilator member 12 has a cross-section such as to conveniently fit the duct without appreciable dilation thereof, a coating layer 17 (Figures 2 and 3) on the dilator member 12 of salicylic acid, and glycerol impregnating the layer 17 rendering the layer coherent and adhesive to the dilator 12 and providing lubrication for the insertion of the dilator 12 into the duct.

In general, the base 11 is conveniently cylindrical in shape although it may be of any convenient shape and size so as to be manually graspable and it may be made of any convenient type of material which is sufficiently rigid to carry out the function of being the manually graspable handle for the instant dilator 10. The dilator member 12 also is preferably made of wood (and is preferably integrally formed with the base 11), although the dilator member 12 may be made of any suitably rigid structural material, which may be the same or different from the material used in the base 11. Preferably, however, the dilator member 12 is made of a material such as wood which can be impregnated at least to some extent with the glycerol-salicylic acid mixture and which will suitably mount a layer of hardened salicylic acid (plasticized by the glycerol) adhering to the dilator surface. Also, the dilator member 12 should have a free end portion 13 which is sufficiently pointed to assist in the initial insertion or penetration of the dilator 10 into the duct, but the end 13 is rounded or blunted slightly so as not to provide a sharp point which might cause additional injuries. Intermediate the ends 13 and 16 of the dilator member 12 there is an expanded portion 14, which has a diameter $t$ of about $0.15 \pm 0.02$ inch. The diameter $t$ may be altered to suit certain peculiar situations but this is about the ideal size to effect the desired dilation of the duct which renders the instant treatment most effective. The enlarged portion 14 is positioned a distance $x$ (preferably about 1 to 1½$t$) from the free end 13 and the overall length $l$ of the dilator member 12 is about 5 to 8$t$. The diameter $n$ at the narrow secured end 16 of the dilator member 12 is about ¼ to ¾$t$, and preferably ½$t$.

One of the important ingredients forming the layer 17 is a keratolytic agent, preferably Salicyclic acid (USP)

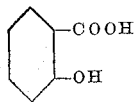

and the other is a non-toxic lubricant plasticizer or carrier for the salicylic acid, preferably Glycerol (USP)

Also satisfactory in the composition are the polyethylene glycols (triethylene glycols and higher) and other compatible alcoholic solvents.

The salicylic acid and glycerol combine to perform a number of unique functions. First of all, these two ingredients cooperate to effect the desired keratolytic action. A key to the instant invention resides in the discovery that keratolytic therapeutic action produces a desired result in the milk duct in overcoming afflictions of the type here involved as well as a tendency toward recurrence of such afflictions. Although it is not desired to limit the invention to any particular theory or concept, it is believed that the greatest injury to the teat with respect to the types of afflictions here involved ultimately takes place within the milk duct. In fact, it is believed that the difficulty or disturbing areas involved are the various portions of the epidermis surrounding the milk duct. "Epidermis" is here used generically to mean the outer layer of the skin (which may or may not include keratoid growths or defects). It is believed, as the instant disclosure indicates, that stoppage develops in the milk duct in the form of keratoid tissue, or at least in a form so similar thereto that it responds to the action of a keratolytic agent such as salicylic acid.

The instant dilators actually effect a larger opening in the teat.

The permanent enlargement of the opening in the cow's teat, or the milk duct, is effected not only through the cooperation between the keratolytic agent and the hygroscopic carrier therefor, but also because of the cooperation between these ingredients and the dilator structure. The dilator 10 is so devised that it effects actual dilation of the milk duct when the dilator 10 is inserted therein. The dilation of the duct near the secured end of the dilator member 12 is relatively slight, but the dilation of the duct near the enlarged portion 14 of the dilator member 12 is quite appreciable. This dilation is not so great as to cause an unusual amount of additional irritation, but it does serve to stretch, break down, disarrange, or otherwise weaken the skin with respect to its ordinary resistance to keratolytic action. The urging of the film of keratolytic agent-lubricant carrier against the stretched and weakened skin portions by the enlarged dilator portion 14 materially assists in accomplishing the keratolytic function and further assists in effecting permanent dilation or enlargement of the milk duct to the extent desired.

In essence, the instant dilator 10 has a coating or layer thereon of the keratolytic agent, salicylic acid, which is effectively present on the surface of the dilator member 12. Salicylic acid per se is normally rather brittle and non-adherent. In the instant device the salicylic acid layer is a relatively hard solid coherent film which resists removal of the layer from the dilator. Actually, the preferred practice is to insert one dilator and work the same up and down in the duct so as to rub off the bulk of the salicylic acid layer within the duct and then insert a second coated dilator which is retained in the duct overnight or until the next milking. The salicylic acid layer is sufficiently coherent and adhesive to resist being rubbed off merely by insertion of the dilator into the duct, but repeated working of the dilator may be used to rub off the layer within the duct, if such is desired.

As previously mentioned, the salicylic acid layer is hardened and coherent and such coherence is effected by the presence of a non-toxic plasticizer or similarly functioning ingredient. In the case of maximum salicylic acid concentration, glycerol (or another non-toxic polyhydric alcohol plasticizer such as triethylene glycol) is admixed with the salicylic acid in plasticizing amounts ranging from 5 or 10% (by weight) to as much as 100% of the acid; and the mixture is heated to obtain a substantially homogeneous mass in which the dilators are dipped and the adhering mixture cools and hardens on the dilator.

Other plasticizers may be used to obtain a salicylic acid layer of this same consistency. Such other plasticizers may include compounds or composition which function to provide a binder-matrix retaining the salicylic acid in plasticized or non-brittle coherent form as, for example, in the case of gum arabic. A particularly effective composition is as follows:

Salicylic acid _____ 1000 gr.
Gum arabic _____ 300 gr.
50% aqueous dextrine _____ Amount sufficient to make a paste.

This paste or salve may be applied to dilators at room temperature and it hardens to the plasticized salicylic acid layer desired.

As used herein the terms "essential ingredients" and "consisting essentially of" mean the active or effective ingredients (for the purposes here indicated) which are included in the instant composition or layer 17 are those herein recited. It will be appreciated that other additives compatible with these materials and not subtracting from the specific functions performed by these materials may be added thereto. For example, coloring matter, stabilizers, anti-oxidants, fungicides, additional bactericides, etc. may be added in minor amounts without departing from the scope of the present invention. For that matter, materials which would assist in certain respects in carrying out the functions of the two principal ingredients may also be added and such materials would include, for example, the anti-biotics which might be used to assist in removing irritation induced by infections or the like. As has been mentioned, the salicylic acid functions as an antiseptic in glycerol; however, the most desirable function of the instant dilator calls for substantial dilation of the milk duct, which could result in the actual opening up or removal of scar tissue, keratoidal tissue and/or minor growths which may develop as a result of previous irritations, and additional precautions against the creation or spreading of infections could be taken by the use of anti-biotics, for example.

An important function of the instant dilator is that of effecting a physiological phenomenon comparable to keratolysis so as to clear away the milk duct to the extent desired. In some instances, however, it may be that the duct is so badly fouled or that infection or scar tissue therein is so severe that the opening of the duct may cause a great deal of immediate irritation to the animal. Anti-biotics can, of course, be used to gradually relieve acute irritation caused by infections, but it may also be desirable to include in the instant composition limited amounts of typical local anesthetics which would serve to relieve the acute pain which it may be necessary to cause in order to effectively use the instant dilators in carrying out the keratolytic function.

In general, the instant procedure involves coating (e. g. by dipping) the dilator with a hardenable flowable plasticized salicylic acid composition, either heated (e. g. to 150–160° C., preferably 156° C. while admixed with ½ of the salicylic acid weight of glycerol, triethylene glycol or the like) or at room temperature (combined with a hardenable plasticizer-binder such as gum arabic plus aqueous dextrine); and then allowing the salicylic acid composition to set. In the gum arabic (or similar natural resin binder) composition the gum sets in the presence of water and the water evaporates partially. The total plasticizer used is merely that sufficient to impart the desired hardened coherence to the acid layer (and may range from 5 or 10% of the composition to about 50 or 60% thereof).

It will be understood that modifications and variations may be effected without departing from the scope of the novel concepts of the present invention.

I claim as my invention:

1. As a dilator for the milk duct in the mammalian teat, a manually graspable base member, an elongated rigid dilator member secured to said base and having a rounded bluntly pointed free end portion which expands slightly in cylindrical cross-section near the free end and then gradually tapers through a decreasing cross-section down to the end secured to the base, the expanded portion of the dilator being slightly greater than the ordinary duct cross-section to expand the latter upon insertion therein, a coating layer on said dilator member of salicylic acid, and glycerol impregnating said layer rendering the same coherent and adhesive to the dilator and providing lubrication for insertion of the dilator into the duct.

2. As a dilator for the milk duct in the mammalian teat, a small cylindrical manually graspable wooden base member, an integral elongated axially aligned wooden dilator member extending from said base and having a rounded bluntly pointed free end portion which expands slightly in cylindrical cross-section near the free end and then gradually tapers through a decreasing cross-section down to the end secured to the base, the expanded portion of the dilator being slightly greater than the ordinary duct cross-section to expand the latter upon insertion therein, a coating layer on said dilator member of salicylic acid, and glycerol impregnating said layer rendering the same coherent and adhesive to the dilator and providing lubrication for insertion of the dilator into the duct.

3. As a dilator for the milk duct in the mammalian teat, a manually graspable base member, an elongated rigid dilator member secured to said base and having a rounded bluntly pointed free end portion which expands slightly in cylindrical cross-section near the free end and then gradually tapers through a decreasing cross-section, the expanded portion of the dilator being slightly greater than the ordinary duct cross-section to expand the latter upon insertion therein, and a layer of hardened plasticized salicylic acid coating said dilator and adhering thereto to resist rubbing off during initial insertion of the dilator into the duct.

4. As a dilator for the milk duct in the mammalian teat, a manually graspable base member, an elongated rigid dilator member secured to said base and having a rounded bluntly pointed free end portion which expands slightly in cylindrical cross-section near the free end and then gradually tapers through a decreasing cross-section down to the end secured to the base, the expanded portion of the dilator being slightly greater than the ordinary duct cross-section to expand the latter upon insertion therein, a coating layer on said dilator member of salicylic acid, and a non-toxic plasticizer for the salicylic acid impregnating said layer rendering the same coherent and adhesive to the dilator.

5. As a dilator for the milk duct in the mammalian teat, a manually graspable base member, an elongated rigid dilator member secured to said base and having a rounded bluntly pointed free end portion which expands slightly in cylindrical cross-section near the free end and then gradually tapers through a decreasing cross-section down to the end secured to the base, the expanded portion of the dilator being slightly greater than the ordinary direct cross-section to expand the latter upon insertion therein, a coating layer on said dilator member of keratolytic material, and glycerol impregnating said layer rendering the same coherent and adhesive to the dilator and providing lubrication for insertion of the dilator into the duct.

References Cited in the file of this patent

UNITED STATES PATENTS

| 1,899,492 | Beebe | Feb. 28, 1933 |
| 1,957,673 | Sayre | May 8, 1934 |
| 2,113,374 | Hall | Apr. 5, 1938 |
| 2,368,576 | Smith | Jan. 30, 1945 |
| 2,584,166 | Stevenson et al. | Feb. 5, 1952 |

FOREIGN PATENTS

| 673,834 | France | Oct. 14, 1929 |

OTHER REFERENCES

United States Dispensatory, Osol-Farrar, 24th ed., 1947.